United States Patent
Lee

(10) Patent No.: US 9,575,159 B2
(45) Date of Patent: Feb. 21, 2017

(54) METHOD AND APPARATUS FOR DETERMINING SPREAD SEQUENCE FOR GENERATING SPREAD SPECTRUM RADAR SIGNAL

(71) Applicant: SNU R&DB FOUNDATION, Seoul (KR)

(72) Inventor: Jae Hong Lee, Seoul (KR)

(73) Assignee: SNU R&DB FOUNDATION (KR)

( * ) Notice: Subject to any disclaimer, the term of this patent is extended or adjusted under 35 U.S.C. 154(b) by 218 days.

(21) Appl. No.: 14/602,564

(22) Filed: Jan. 22, 2015

(65) Prior Publication Data

US 2015/0212195 A1 Jul. 30, 2015

(30) Foreign Application Priority Data

Jan. 28, 2014 (KR) ........................ 10-2014-0010454

(51) Int. Cl.
| | |
|---|---|
| *G01S 13/93* | (2006.01) |
| *G01S 7/02* | (2006.01) |
| *G01S 13/28* | (2006.01) |
| *G01S 13/32* | (2006.01) |
| *G01S 13/42* | (2006.01) |
| *G01S 13/58* | (2006.01) |
| *G01S 13/86* | (2006.01) |

(52) U.S. Cl.
CPC .............. *G01S 7/023* (2013.01); *G01S 13/284* (2013.01); *G01S 13/42* (2013.01); *G01S 13/582* (2013.01); *G01S 13/86* (2013.01); *G01S 13/93* (2013.01); *G01S 13/931* (2013.01); *G01S 2013/9375* (2013.01); *G01S 2013/9389* (2013.01)

(58) Field of Classification Search
CPC ...... G01S 7/023; G01S 13/284; G01S 13/286; G01S 13/288; G01S 13/325; G01S 13/86; G01S 13/93; G01S 13/931; G01S 13/9303; G01S 2013/9375; G01S 2013/9389
USPC ........................................ 342/123, 128–144
See application file for complete search history.

(56) References Cited

U.S. PATENT DOCUMENTS

| | | | | | |
|---|---|---|---|---|---|
| 3,849,782 | A | * | 11/1974 | Bond | ................. G01S 13/9303 342/30 |
| 3,947,845 | A | * | 3/1976 | Lyon | ................. G01S 13/9303 342/30 |
| 4,945,360 | A | * | 7/1990 | Trummer | ................. G01S 7/35 342/122 |

(Continued)

FOREIGN PATENT DOCUMENTS

| | | |
|---|---|---|
| JP | 08278362 | 10/1996 |
| JP | 09257919 | 10/1997 |

(Continued)

*Primary Examiner* — Peter Bythrow
(74) *Attorney, Agent, or Firm* — Cantor Colburn LLP

(57) ABSTRACT

A method for transmitting a spread spectrum radar signal stores a plurality of spread sequences. Further, an elevation of a vehicle is measured by the method. Based on the measured elevation of the vehicle, the method selects at least one spread sequence of the plurality of spread sequences, and transmits a spread spectrum radar signal based on the selected at least one spread sequence. Additionally, the method may measure a travel direction of the vehicle, and then select at least one spread sequence based on the measured elevation of the vehicle and the measured travel direction of the vehicle.

24 Claims, 9 Drawing Sheets

(56) References Cited

U.S. PATENT DOCUMENTS

| | | | | |
|---|---|---|---|---|
| 4,958,161 | A * | 9/1990 | Allezard | G01S 13/343 |
| | | | | 342/120 |
| 5,115,244 | A * | 5/1992 | Freedman | G01S 13/22 |
| | | | | 342/137 |
| 5,526,676 | A * | 6/1996 | Solheim | G01K 11/006 |
| | | | | 324/640 |
| 5,636,123 | A * | 6/1997 | Rich | G01S 5/0072 |
| | | | | 342/29 |
| 5,724,041 | A * | 3/1998 | Inoue | G01S 7/285 |
| | | | | 342/70 |
| 5,724,043 | A * | 3/1998 | Savage | G01W 1/10 |
| | | | | 342/351 |
| 5,920,287 | A * | 7/1999 | Belcher | G01S 5/021 |
| | | | | 342/450 |
| 6,822,605 | B2 * | 11/2004 | Brosche | G01S 7/282 |
| | | | | 342/130 |
| 7,620,364 | B2 * | 11/2009 | Higashida | H04B 7/18508 |
| | | | | 455/11.1 |
| 8,594,662 | B2 * | 11/2013 | Hadinger | H04B 7/18508 |
| | | | | 455/12.1 |

FOREIGN PATENT DOCUMENTS

| | | |
|---|---|---|
| JP | 09318738 | 12/1997 |
| JP | 2000275338 | 10/2000 |

* cited by examiner

METHOD AND APPARATUS FOR DETERMINING SPREAD SEQUENCE FOR GENERATING SPREAD SPECTRUM RADAR SIGNAL

CROSS-REFERENCE TO RELATED APPLICATION(S)

This application claims the benefit of Korean Patent Application No. 10-2014-0010454, filed on Jan. 28, 2014, in the Korean Intellectual Property Office, the disclosure of which is incorporated herein in its entirety by reference.

TECHNICAL FIELD

The present disclosure relates to the application of a spread sequence for generating a spread spectrum radar signal and, particularly, to a method and an apparatus for determining a spread sequence in generating a spread spectrum radar signal.

BACKGROUND

In order to prevent collisions that may occur while driving a vehicle such as a car, a radar device that is capable of detecting obstacles in the vicinity (e.g., pedestrians, other vehicles, etc.) may be mounted on the vehicle. If an obstacle near the vehicle is detected, the radar device of the vehicle provides detection information on the obstacle to a driver. In response, the driver may appropriately control the vehicle, for example, by stopping the vehicle. Additionally, a control device of the vehicle may receive the detection information on the obstacle from the radar device and automatically control the vehicle without manual operation of the driver.

A radar device for such vehicles may be implemented with a pulse radar, a FMCW (Frequency Modulated Continuous Wave) radar, a spread spectrum radar, or the like. Among these radars, the pulse radar is defective in that, due to high power transmission, it is difficult to detect an object at close ranges and achieve high resolution. Also, the FMCW radar is defective in that, due to continuous signal transmission, interference with other radar signals may occur. On the other hand, the spread spectrum radar, which may use a PN (Pseudo-Noise) sequence or the like as a spectrum spread sequence, is advantageous in that it is possible to achieve a high resolution and suppress frequency interference.

However, if the spread sequence that is used in one spread spectrum radar device mounted on a vehicle is identical to the spread sequence that is used in another spread spectrum radar device mounted on another vehicle, interference may occur between such spread spectrum radar devices. For example, if spread spectrum radar devices that are mounted, respectively, on a vehicle travelling on the road on the ground and another vehicle travelling on an overpass road (or an underground road) use an identical spread sequence, interference may occur between radar signals transmitted from the spread spectrum radar devices, which may lead to errors in detecting obstacles. Therefore, it is necessary to prevent interference between radar signals transmitted from radar devices, which are mounted on vehicles travelling on roads of different heights.

SUMMARY

The present disclosure relates to the prevention of interference between radar signals from spread spectrum radar devices when vehicles equipped with the spread spectrum radar devices travel on the roads with different elevations.

According to an aspect of the present disclosure, there is provided a method for transmitting a spread spectrum radar signal, including: storing a plurality of spread sequences; measuring an elevation of a vehicle; selecting at least one spread sequence of the plurality of spread sequences based on the measured elevation of the vehicle; and transmitting a spread spectrum radar signal based on the selected at least one spread sequence.

In this method, storing the plurality of spread sequences includes storing a plurality of elevation ranges and the plurality of spread sequences by associating the plurality of elevation ranges with the plurality of spread sequences, and selecting the at least one spread sequence of the plurality of spread sequences based on the measured elevation of the vehicle includes: determining an elevation range, which includes the measured elevation of the vehicle, from the plurality of elevation ranges; and selecting a spread sequence associated with the determined elevation range.

In this method, selecting the at least one spread sequence of the plurality of spread sequences based on the measured elevation of the vehicle includes selecting two or more spread sequences, and transmitting the spread spectrum radar signal based on the selected at least one spread sequence includes transmitting two or more spread spectrum radar signals based on the selected two or more spread sequences.

This method further includes measuring a travel direction of the vehicle. In this case, selecting the at least one spread sequence of the plurality of spread sequences based on the measured elevation of the vehicle includes selecting the at least one spread sequence based on the measured elevation of the vehicle and the measured travel direction of the vehicle.

According to another aspect of the present disclosure, there is provided an apparatus for transmitting a spread spectrum radar signal, including: a storage unit configured to store a plurality of spread sequences; an elevation measurement unit configured to measure an elevation of a vehicle; a processor configured to select at least one spread sequence of the plurality of spread sequences based on the measured elevation of the vehicle; and a transmission unit configured to transmit a spread spectrum radar signal based on the selected at least one spread sequence.

In this apparatus, the storage unit is configured to store a plurality of elevation ranges and the plurality of spread sequences by associating the plurality of elevation ranges with the plurality of spread sequences, and the processor is configured to: determine an elevation range, which includes the measured elevation of the vehicle, from the plurality of elevation ranges; and select a spread sequence associated with the determined elevation range.

In this apparatus, the processor is configured to select two or more spread sequences of the plurality of spread sequences based on the measured elevation of the vehicle, and the transmission unit is configured to transmit two or more spread spectrum radar signals based on the selected two or more spread sequences.

This apparatus further includes a travel direction measurement unit configured to measure a travel direction of the vehicle. In this apparatus, the processor is configured to select the at least one spread sequence based on the measured elevation of the vehicle and the measured travel direction of the vehicle.

According to still another aspect of the present disclosure, there is provided a method for selecting a spread sequence, including: storing a plurality of spread sequences; measuring an elevation of a vehicle; generating elevation data indicative of the measured elevation of the vehicle; and selecting at least one spread sequence of the plurality of spread sequences based on the elevation data. In this method, the selected spread sequence is a spread sequence different from a spread sequence that is selectable by a vehicle travelling on an elevation different from the elevation of the vehicle.

According to yet another aspect of the present disclosure, there is provided a method for transmitting a spread spectrum radar signal, including: measuring an elevation of a vehicle; determining a spread sequence based on the measured elevation of the vehicle; and transmitting a spread spectrum radar signal based on the determined spread sequence.

According to yet another aspect of the present disclosure, there is provided a non-transitory computer-readable storage medium having a program including instructions that, when executed, cause a processor to perform operations of: storing a plurality of spread sequences; measuring an elevation of a vehicle; selecting at least one spread sequence of the plurality of spread sequences based on the measured elevation of the vehicle; and transmitting a spread spectrum radar signal based on the selected at least one spread sequence.

DETAILED DESCRIPTION

Hereinafter, embodiments of the present disclosure will be described in detail with reference to the accompanying drawings. However, a detailed explanation of well-known functions or constructions will be omitted if there is a concern that such explanation may unnecessarily obscure the gist of the present disclosure.

Figure 1:
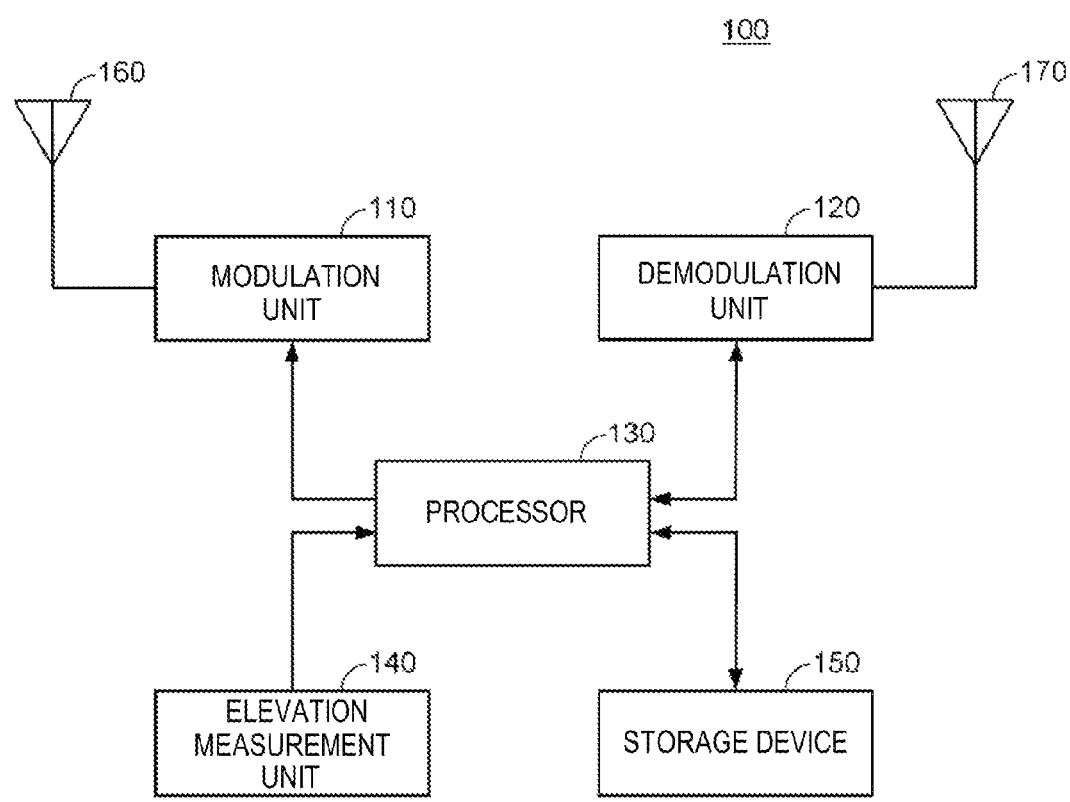
FIG. 1 illustrates a configuration of a spread spectrum radar device that is configured to generate and transmit a spread spectrum radar signal based on an elevation, according to one embodiment of the present disclosure.

FIG. 1 illustrates a configuration of a spread spectrum radar device 100 that is configured to generate and transmit a spread spectrum radar signal based on an elevation, according to one embodiment of the present disclosure. The spread spectrum radar device 100 includes a modulation unit 110, a demodulation unit 120, a processor 130, an elevation measurement unit 140, and a storage device 150. The spread spectrum radar device 100 further includes a transmitting antenna 160 connected to the modulation unit 110 and a receiving antenna 170 connected to the demodulation unit 120.

The elevation measurement unit 140 may be configured to measure an elevation of the spread spectrum radar device 100. The elevation measurement unit 140 may measure the elevation above sea level based on a reference water surface, or determine the elevation by measuring a relative height to a predetermined reference level. In one embodiment, the elevation measurement unit 140 may be configured to measure the elevation according to a well-known conventional method that determines an elevation by measuring a pressure or identifying a position. To identify the position, a conventional GPS (Global Positioning System) device may be used.

The storage device 150 may store a plurality of spread sequences. In some embodiments, sequences that are distinguished from each other (for example, orthogonal sequences) may be used as the spread sequences stored in the storage device 150. For example, a pseudo-noise sequence such as an m-sequence, a GMW (Gordon-Mills-Welch) sequence, a Legendre sequence, a Hall's Sextic Residue sequence, an extended sequence, an Kasami sequence, a Gold sequence, a Bent sequence, and the like may be used as the spread sequences. In addition to the pseudo-noise sequence, sequences that are distinguished from each other, such as a Walsh-Hadamard code, may be used as the spread sequences. Hereinafter, the plurality of spread sequences may be denoted as, for example, $S_1$, $S_2$, $S_3$, ..., $S_n$.

In the case of using the pseudo-noise sequences, a plurality of cyclically different pseudo-noise sequences may be provided according to a given pseudo-noise sequence period. For example, if the pseudo-noise sequence period is 31, the pseudo-noise sequences $S_1$, $S_2$, $S_3$, $S_4$, $S_5$, and $S_6$ may be provided, as follows:

$S_1$: 0011010010000101011101100011111
$S_2$: 0001101110101000010010110011111
$S_3$: 0111000101011010000110010011111
$S_4$: 0010011000010110101000111011111
$S_5$: 0110011100001101010010001011111
$S_6$: 0100010010101100001110011011111

The storage device 150 may store the spread sequences, which may correspond to elevation values, for example, in the form of a lookup table. In one embodiment, a specific elevation range (e.g., the entire elevation range from a lower limit to an upper limit, which can be measured by the elevation measurement unit 140) is divided into a plurality of partial elevation ranges. Further, a plurality of spread sequences is assigned to the plurality of partial elevation ranges, respectively, and is stored in the storage device 150. In this process, the plurality of spread sequences may be distributed to the plurality of partial elevation ranges in any suitable manner. According to an embodiment, each partial elevation range may include a set of sequences. For example, the partial elevation ranges may include the same number or different numbers of the spread sequences. The number of the spread sequences included in one partial elevation range may be one or more. Hereinafter, the plurality of partial elevation ranges may be denoted as, for example, $R_1, R_2, R_3, \ldots, R_m$.

The storage device 150 may be configured as a conventional memory device, for example, RAM (Random Access Memory), ROM (Read-Only Memory), EEPROM (Electrically Erasable Programmable Read-Only Memory), Flash Memory, etc. On the other hand, according to an embodiment of the present disclosure, the processor 130 may include the storage device 150 in the form of a cache memory or the like. The storage device 150 may store programs and data that are required for operating the spread spectrum radar device 100.

The processor 130 may be programmed to receive elevation information (or elevation data) outputted from the elevation measurement unit 140, and determine a spread sequence based on the elevation information. The processor 130 may select one or more spread sequences from the plurality of spread sequences that are pre-stored in the storage device 150. For example, in the embodiment where the storage device 150 stores a lookup table that associates an elevation to a spread sequence, the processor 130 may read, from the lookup table, one or more spread sequences that is associated with the elevation information. In the embodiment where a plurality of spread sequences is assigned to a plurality of partial elevation ranges, the processor 130 may determine a partial elevation range that includes an elevation value indicated by the elevation information, and select a spread sequence from one or more spread sequences that have been assigned to the partial elevation range.

The processor 130 is a computing device that performs or controls the overall operations of the spread spectrum radar device 100, which include the operation of determining a spread sequence of the present disclosure. For example, a general-purpose processor, such as a conventional CPU (Central Processing Unit), MCU (Microcontroller Unit), ECU (Electronic Control Unit), AP (Application Processor), may be used as the processor 130 of the present disclosure. Further, a dedicated processor for the spread spectrum radar device 100 may be configured as the processor 130 of the present disclosure.

The modulation unit 110 may be configured to receive the selected spread sequence from the processor 130 and generate a spread spectrum radar signal, which may be a broadband signal, based on the spread sequence. For example, a spread spectrum radar signal may be generated by spread-modulating the spread sequence. In this operation, the modulation unit 110 may receive a narrowband signal from a carrier signal source (not shown) and use this signal in the modulation process. The spread spectrum radar signal generated in the modulation unit 110 may be transmitted via the transmitting antenna 160.

The receiving antenna 170 may be configured to receive a spread spectrum radar signal. The received spectrum radar signal may be a reflected signal of the spread spectrum radar signal, which has been transmitted by the transmitting antenna 160 and reflected by an object that exists on the travel direction of the signal. On the other hand, the received spread spectrum radar signal may be a spread spectrum radar signal, which is transmitted from another spread spectrum radar device.

The demodulation unit 120 may be configured to demodulate the received spread spectrum radar signal, which is provided from the receiving antenna 170, to obtain a spread sequence. To determine whether an object is detected, how far the object exists, etc., the processor 130 compares the spread sequence, which is provided to the modulation unit 110 for use in the modulation, and the spread sequence, which is received from the demodulation unit 120. For example, a correlation between the above spread sequences is calculated and, if the correlation is greater than a predetermined threshold, it can be determined that an object is detected. In this case, the distance to the detected object may be determined based on the transmission time and the reception time of the spread spectrum radar signals.

The processor 130 may perform additional operations based on detection information, which includes whether an object is detected, how far the object exists, etc. For example, the processor 130 may output the detection information to a user or an operator via an output unit (not shown) of the spread spectrum radar device 100. In this case, the output unit may include an LCD (liquid crystal display) screen, a speaker, or the like.

The spread spectrum radar device 100 may be, for example, mounted on a vehicle that travels on the road, and operated to detect an object in the vicinity of the vehicle. The spread spectrum radar device 100 may be mounted on any suitable position in the vehicle. For example, the spread spectrum radar device 100 may be mounted on the front part of the vehicle in order to detect an object that is located ahead of the vehicle.

According to one embodiment of the present disclosure, a plurality of transmitting antennas 160 and a plurality of receiving antennas 170 may be mounted, respectively, in a plurality of parts of the vehicle in order to detect objects located in at least two directions (for example, in forward, rearward, leftward, and rightward directions) from the vehicle. In this case, the spread spectrum radar device 100 may determine a plurality of different spread sequences and transmit spread spectrum radar signals, which are generated, respectively, based on the spread sequences, via the plurality of transmitting antennas 160. For example, if one partial elevation range is determined based on a measured elevation, different spread sequences may be selected from a plurality of spread sequences that have been assigned to the partial elevation range.

The vehicle equipped with the spread spectrum radar device 100 may include a control device, which is configured to receive the detection information from the spread spectrum radar device 100 and automatically control the vehicle based on the detection information, for example, to stop the vehicle or change the direction that the vehicle is moving.

In addition to a conventional car, the spread spectrum radar device 100 of the present disclosure may be mounted on and used by any other suitable types of vehicles, such as a train, a bicycle, a motorcycle, an airplane, and the like. The spread spectrum radar device 100 may be used in vehicles flying in the air, as well as vehicles travelling on the road.

Figure 2:
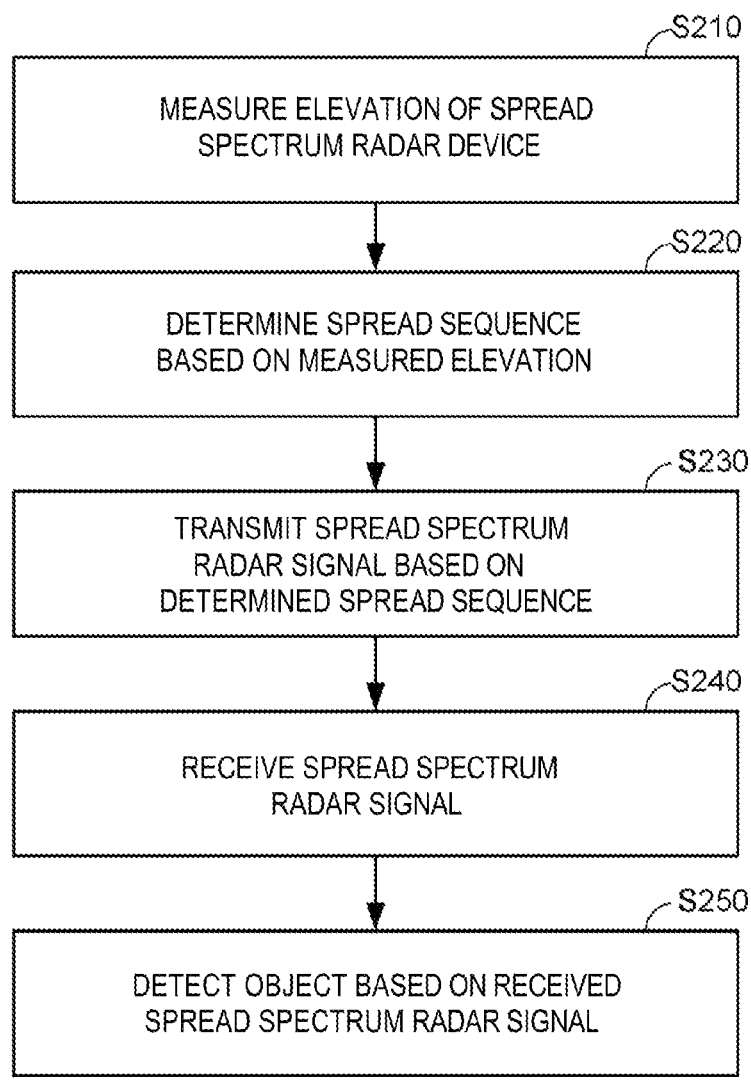
FIG. 2 is a flow chart of a method, performed by the spread spectrum radar device, for generating and transmitting a spread spectrum radar signal based on an elevation, according to one embodiment of the present disclosure.
Figure 3:
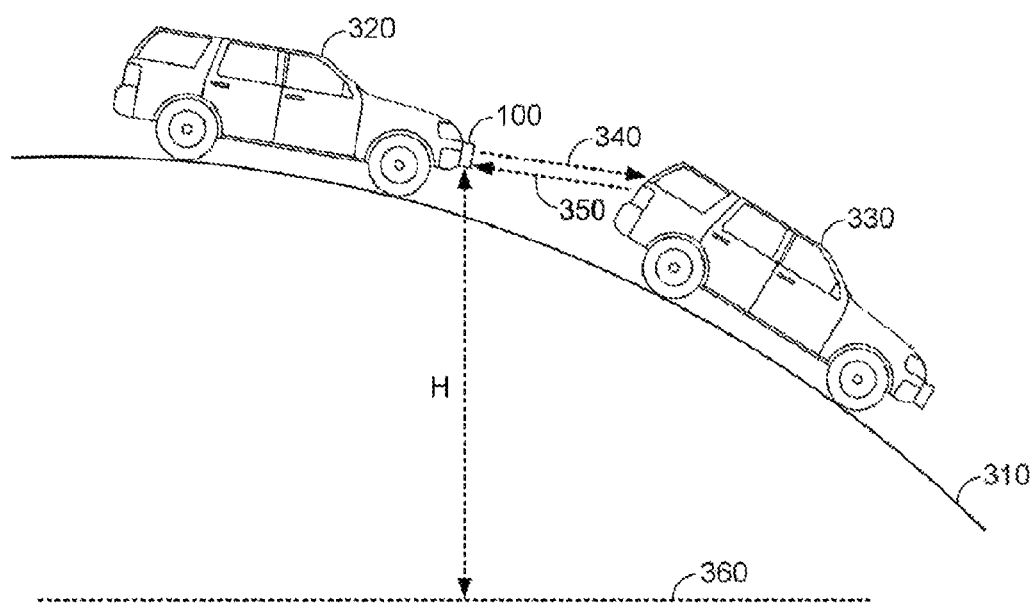
FIG. 3 illustrates an example where the spread spectrum radar device mounted on a vehicle transmits a spread spectrum radar signal, according to one embodiment of the present disclosure.
Figure 4:
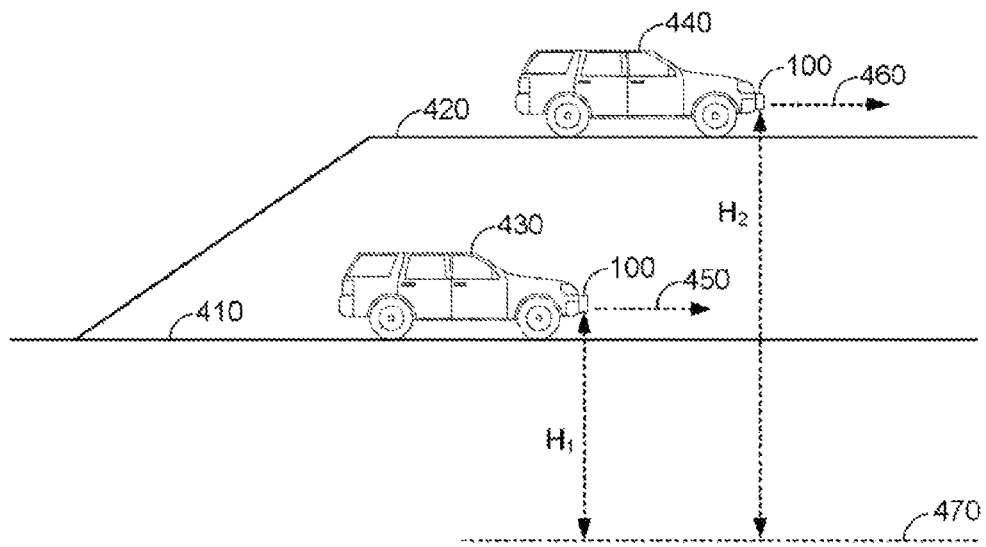
FIG. 4 illustrates an example where vehicles, which travel on different elevations, respectively, transmit spread spectrum radar signals based on measured elevations, according to one embodiment of the present disclosure.
Figure 5:
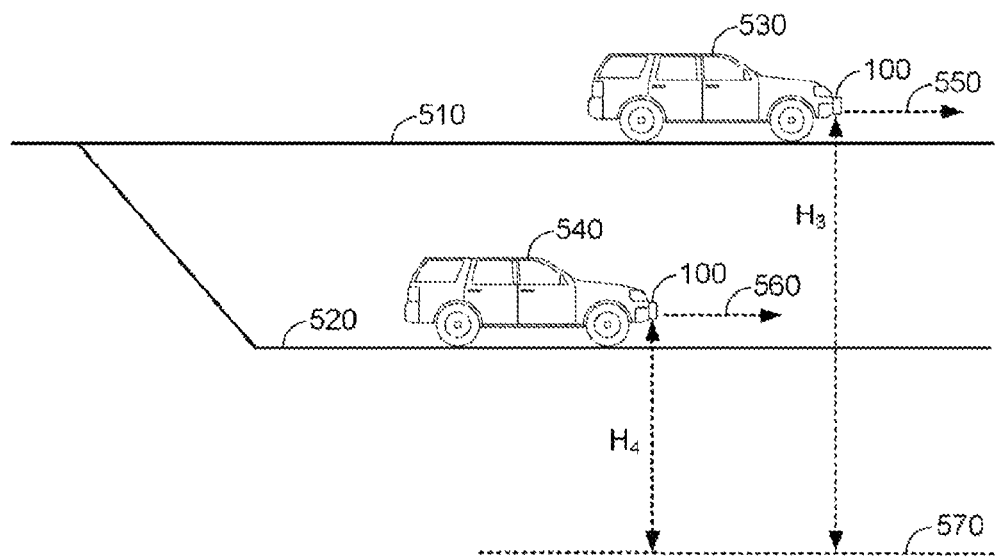
FIG. 5 illustrates another example where vehicles, which travel on different elevations, respectively, transmit spread spectrum radar signals based on measured elevations, according to one embodiment of the present disclosure.

FIG. 2 illustrates a flow chart of a method, performed by the spread spectrum radar device 100, for generating and transmitting a spread spectrum radar signal based on an elevation, according to one embodiment of the present disclosure. FIG. 3 illustrates an example where the spread spectrum radar device 100 mounted on a vehicle 320 transmits a spread spectrum radar signal 340, according to one embodiment of the present disclosure. FIG. 4 illustrates an example where vehicles 430 and 440, which travel on different elevations, respectively, transmit spread spectrum radar signals 450 and 460 based on measured elevations, according to one embodiment of the present disclosure. FIG. 5 illustrates another example where vehicles 530 and 540, which travel on different elevations, respectively, transmit spread spectrum radar signals 550 and 560 based on measured elevations, according to one embodiment of the present disclosure. Hereinafter, with reference to FIGS. 2 to 5, the operation of the spread spectrum radar device 100 will be described.

At S210, the spread spectrum radar device 100 measures an elevation of the spread spectrum radar device 100. The spread spectrum radar device 100 is mounted on vehicles 320, 430, 440, 530, and 540 that travel on the roads 310, 410, 420, 510, and 520, respectively. In FIGS. 3 to 5, the spread spectrum radar device 100 is mounted on the front part of the vehicles 320, 430, 440, 530, and 540 to detect an object that is ahead of the vehicles 320, 430, 440, 530, and 540.

When the elevation is measured in the example of FIG. 3, a reference level 360 may be predetermined, and the spread spectrum radar device 100 may measure a height H from the reference level 360 as the elevation.

FIG. 4 shows an example where at least a portion of the road includes two levels in a vertical direction, i.e., a lower road 410 and an upper road 420 (e.g., in the form of an overpass road). The first vehicle 430 travels on the lower road 410, and the second vehicle 440 travels on the upper road 420. When an elevation is measured in this example, a reference level 470 may be predetermined. The spread spectrum radar device 100 mounted on the first vehicle 430 measures a height $H_1$ from the reference level 470 as a first elevation, and the spread spectrum radar device 100 mounted on the second vehicle 440 measures a height $H_2$ from the reference level 470 as a second elevation.

FIG. 5 shows an example where at least a portion of the road includes two levels in a vertical direction, i.e., an upper road 510 and a lower road 520 (e.g., in the form of an underpass road). The third vehicle 530 travels on the upper road 510, and the fourth vehicle 540 travels on the lower road 520. When an elevation is measured in this example, a reference level 570 may be predetermined. The spread spectrum radar device 100 mounted on the third vehicle 530 measures a height $H_3$ from the reference level 570 as a third elevation, and the spread spectrum radar device 100 mounted on the fourth vehicle 540 measures a height $H_4$ from the reference level 570 as a fourth elevation. The elevations H, $H_1$, $H_2$, $H_3$, and $H_4$ of the spread spectrum radar device 100, which are measured as above, may be considered as the elevations of the vehicles 320, 430, 440, 530, and 540, respectively.

At S220, the spread spectrum radar device 100 determines a spread sequence based on the measured elevations H, $H_1$, $H_2$, $H_3$, and $H_4$. In the example of FIG. 3, a spread sequence is determined based on the elevation H of the vehicle 320.

In the example of FIG. 4, the spread spectrum radar device 100 of the first vehicle 430 determines a first spread sequence based on the first elevation $H_1$, and the spread spectrum radar device 100 of the second vehicle 440 determines a second spread sequence based on the second elevation $H_2$. Since the first elevation $H_1$ and the second elevation $H_2$ are different from each other, the determined first and second spread sequences may be different from each other.

In the example of FIG. 5, the spread spectrum radar device 100 of the third vehicle 530 determines a third spread sequence based on the third elevation $H_3$, and the spread spectrum radar device 100 of the fourth vehicle 540 determines a fourth spread sequence based on the fourth elevation $H_4$. Since the third elevation $H_3$ and the fourth elevation $H_4$ are different from each other, the determined third and fourth spread sequences may be different from each other.

When the spread sequence is determined based on the elevation H, $H_1$, $H_2$, $H_3$, or $H_4$, the spread spectrum radar device 100 may select one spread sequence from a plurality of spread sequences stored in the storage device 150. For example, one embodiment may be configured such that a plurality of pseudo-noise sequences $S_1$, $S_2$, $S_3$, . . . , $S_n$ is assigned to a plurality of partial elevation ranges $R_1$, $R_2$, $R_3$, . . . , $R_m$ and stored in the storage device 150. In this embodiment, the spread spectrum radar device 100 determines a partial elevation range (e.g., $R_k$) that includes the measured elevation H, $H_1$, $H_2$, $H_3$, or $H_4$, and selects one spread sequence from one or more spread sequences that have been assigned to the partial elevation range $R_k$.

For example, in the configuration where six partial elevation ranges $R_1$, $R_2$, $R_3$, $R_4$, $R_5$, and $R_6$ are set, given that the pseudo-noise sequence period is 31, six spread sequences $S_1$, $S_2$, $S_3$, $S_4$, $S_5$, and $S_6$ may be assigned to the partial elevation ranges $R_1$, $R_2$, $R_3$, $R_4$, $R_5$, and $R_6$, as follows:

R1={S1}
R2={S2}
R3={S3}
R4={S4}
R5={S5}
R6={S6}

In this case, if the measured elevation H, $H_1$, $H_2$, $H_3$, or $H_4$ is in the elevation range of $R_3$, the spread sequence $S_3$ is determined as the spread sequence for the measured elevation H, $H_1$, $H_2$, $H_3$, or $H_4$.

On the other hand, in the configuration where three partial elevation ranges $R_1$, $R_2$, and $R_3$ are set, given that the pseudo-noise sequence period is 31, six spread sequences $S_1$, $S_2$, $S_3$, $S_4$, $S_5$, and $S_6$ may be assigned to the partial elevation ranges $R_1$, $R_2$, and $R_3$, as follows:

R1={S1, S2}
R2={S3, S4}
R3={S5, S6}

In this case, if the measured elevation H, $H_1$, $H_2$, $H_3$, or $H_4$ is in the elevation range of $R_2$, one of the assigned spread sequences $S_3$ and $S_4$ is selected as the spread sequence for the measured elevation H, $H_1$, $H_2$, $H_3$, or $H_4$.

At S230, the spread spectrum radar device 100 transmits the spread spectrum radar signals 340, 450, 460, 550, or 560 based on the determined spread sequence. In the example of FIG. 3, as shown, the spread spectrum radar device 100 mounted on the front part of the vehicle 320 transmits the spread spectrum radar signal 340.

In the example of FIG. 4, the first vehicle 430 transmits the first spread spectrum radar signal 450 that is generated based on the first spread sequence, and the second vehicle 440 transmits the second spread spectrum radar signal 460 that is generated based on the second spread sequence. Since the first spread sequence is different from the second spread sequence, the first spread spectrum radar signal 450 may also be different from the second spread spectrum radar signal 460. Thus, interference does not occur between the radar signals that are transmitted by the spread spectrum radar devices 100 mounted on the first vehicle 430 and the second vehicle 440.

In the example of FIG. 5, the third vehicle 530 transmits the third spread spectrum radar signal 550 that is generated based on the third spread sequence, and the fourth vehicle 540 transmits the fourth spread spectrum radar signal 560 that is generated based on the fourth spread sequence. Since the third spread sequence is different from the fourth spread sequence, the third spread spectrum radar signal 550 may also be different from the fourth spread spectrum radar signal 560. Thus, interference does not occur between the radar signals that are transmitted by the spread spectrum radar devices 100 mounted on the third vehicle 530 and the fourth vehicle 540.

At S240, the spread spectrum radar device 100 receives a spread spectrum radar signal 350 via the receiving antenna 170. In the example of FIG. 3, the received spread spectrum radar signal 350 is a reflected signal of the spread spectrum radar signal 340, which has been transmitted by the spread spectrum radar device 100 mounted on the vehicle 320 and reflected by an object, such as another vehicle 330 travelling on the road 310.

At S250, the spread spectrum radar device 100 determines that an object is detected based on the received spread spectrum radar signal. In this operation, the spread spectrum radar device 100 compares the spread sequence, which was used in modulation, and the spread sequence, which is obtained by demodulating the received spread spectrum radar signal, to determine whether an object is detected, how far the object is from the vehicle, etc. For example, a correlation between the above spread sequences is calculated and, if the correlation is greater than a predetermined threshold, it can be determined that an object is detected. In this case, the distance to the detected object may be determined based on the transmission time of the transmitted spread spectrum radar signal and the reception time of the received spread spectrum radar signal.

The object detection information may include the existence of an object and the distance to the object. If the detection information, such as the existence of an object and the distance to the object, is determined, the spread spectrum radar device 100 in the vehicle 320, 430, 440, 530, or 540 may output the detection information via an output device (not shown), for example, a display screen or a speaker. The driver of the vehicles 320, 430, 440, 530, or 540 may view or hear the outputted detection information, and stop the vehicle or control the travel direction of the vehicle.

Figure 6:
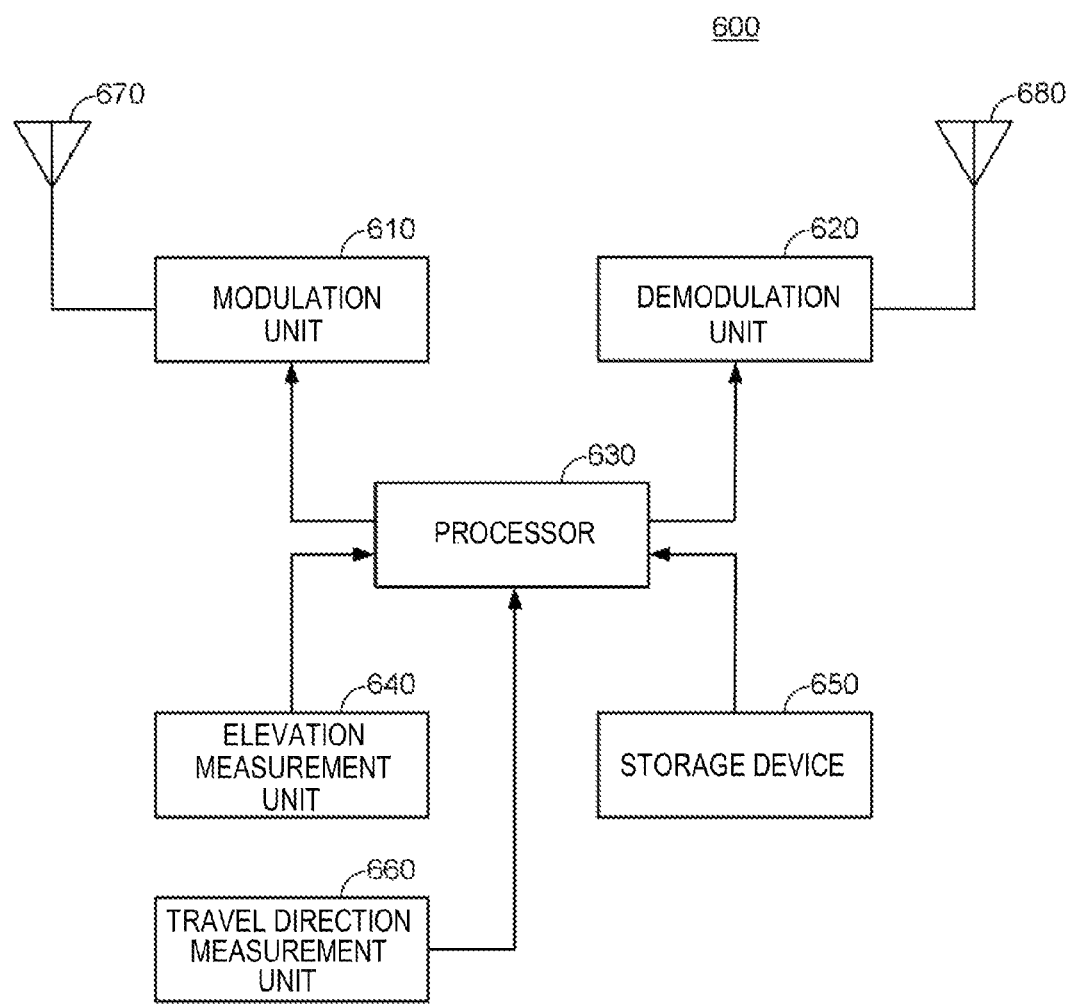
FIG. 6 illustrates a configuration of a spread spectrum radar device configured to generate and transmit a spread spectrum radar signal based on an elevation and a travel direction, according to one embodiment of the present disclosure.

FIG. 6 illustrates a configuration of a spread spectrum radar device 600 configured to generate and transmit a spread spectrum radar signal based on an elevation and a travel direction, according to one embodiment of the present disclosure.

The spread spectrum radar device 600 includes a modulation unit 610, a demodulation unit 620, a processor 630, an elevation measurement unit 640, a storage device 650, a travel direction measurement unit 660, a transmitting antenna 670, and a receiving antenna 680. Since the modulation unit 610, the demodulation unit 620, the processor 630, the elevation measurement unit 640, the storage device 650, the transmitting antenna 670, and the receiving antenna 680 have the same or similar configurations to the modulation unit 110, the demodulation unit 120, the processor 130, the elevation measurement unit 140, the storage device 150, the transmitting antenna 160, and the receiving antenna 170 illustrated in FIG. 1, detailed descriptions for the above elements are omitted.

The travel direction measurement unit 660 may be configured to measure a travel direction of the spread spectrum radar device 600. Travel direction information (or travel direction data) may indicate whether the spread spectrum radar device 600 moves and where the spread spectrum radar device 600 moves (i.e., moving direction). For example, the travel direction measurement unit 660 may measure a travel direction of a vehicle in a two-dimensional plane using a compass (e.g., an electronic compass, a digital compass, etc.). In one embodiment, the travel direction measurement unit 660 may measure the travel direction of a vehicle using a gyroscope (e.g., a MEMS (micro electro mechanical systems) gyroscope, a fiber optic gyroscope, a vibrating structure gyroscope, a dynamically tuned gyroscope, a London gyroscope, a gyrostat, etc.). In another embodiment, the travel direction of a vehicle may be measured using a GPS device that measures the position of the vehicle. In this embodiment, a change in the position is measured during a predetermined time interval using GPS, and the travel direction may be derived from the change in the position.

According to one embodiment, the travel direction measurement unit 660 may measure the travel direction of a vehicle in a three-dimensional space. For example, the elevation measurement unit 640 measures the elevation change of a vehicle during a predetermined time interval, and derives the vertical travel direction (e.g., ascending or descending direction) and the travel speed (e.g., ascending or descending speed) of the vehicle from the elevation change. The travel direction measurement unit 660 may derive the three-dimensional travel direction of the vehicle based on the travel direction and travel speed of the vehicle in a two-dimensional plane, which are measured using a GPS or the like, and the vertical travel direction and travel speed of the vehicle, which are received from the elevation measurement unit 640.

The storage device 650 may store a plurality of spread sequences that is associated with a plurality of combinations of elevations and travel directions. In one embodiment, the entire elevation range that can be measured by the elevation measurement unit 640 is divided into a plurality of partial elevation ranges, and the entire travel direction range that can be measured by the travel direction measurement unit 660 is divided into a plurality of partial travel direction ranges. In this embodiment, a plurality of spread sequences may be assigned to correspond to a plurality of combinations of the partial elevation ranges and the partial travel direction ranges, and stored in the storage device 650. Hereinafter, the plurality of combinations of elevations and travel directions may be denoted as, for example, $C_1, C_2, C_3, \ldots, C_s$.

The processor 630 may be programmed to determine a spread sequence based on the combination of elevation information and travel direction information, upon receiving the elevation information outputted from the elevation measurement unit 640 and the travel direction information outputted from the travel direction measurement unit 660. The processor 630 may access the storage device 650 and determine a spread sequence, which corresponds to the combination of the received elevation information and the received travel direction information, from the plurality of spread sequences stored in the storage device 650.

The modulation unit 610 generates a spread spectrum radar signal based on the spread sequence provided from the processor 630, and transmits the signal via the transmitting antenna 670. The receiving antenna 680 receives a reflected spread spectrum radar signal, and the demodulation unit 620 generates a spread sequence by demodulating the received signal and provides the generated spread sequence to the processor 630. Based on the spread sequence, which is provided to the modulation unit 610, and the spread sequence, which is provided from the demodulation unit 620, the processor 630 determines the existence of an object and the distance to such an object, as detection information.

Figure 7:
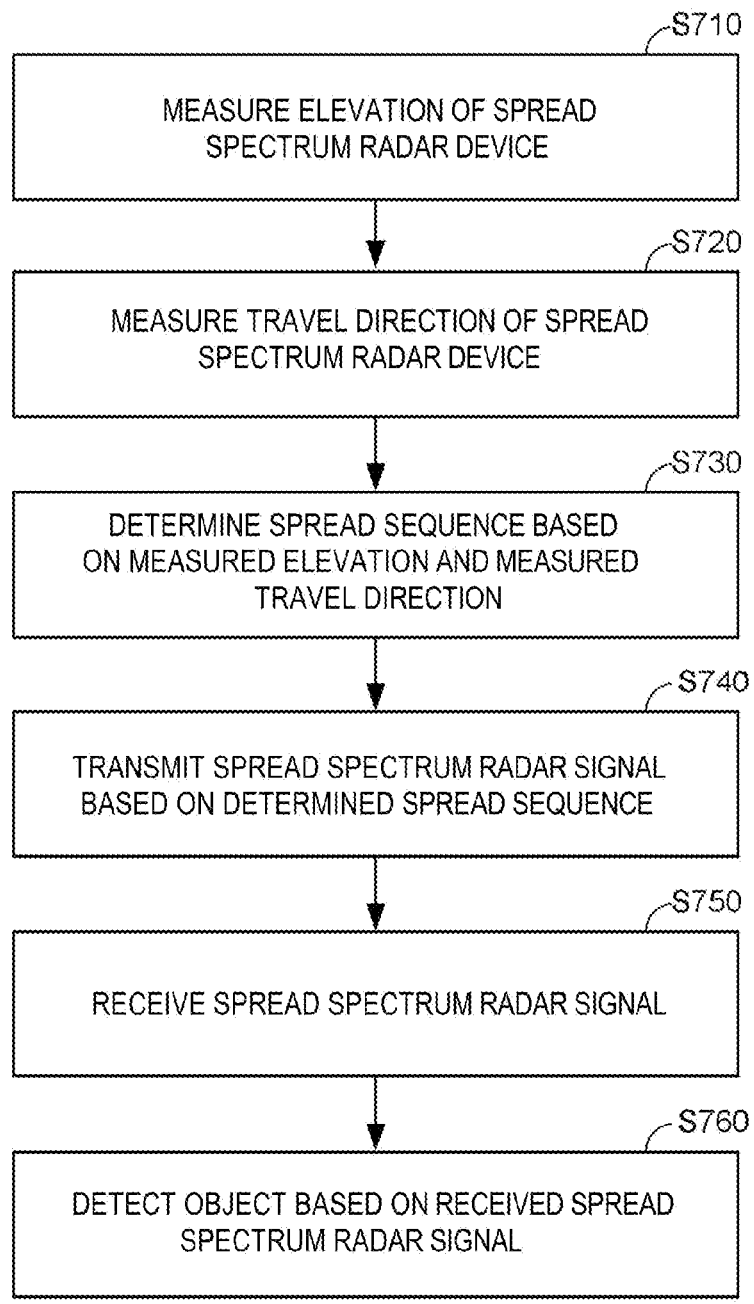
FIG. 7 is a flow chart of a method, performed by the spread spectrum radar device, for generating and transmitting a spread spectrum radar signal based on an elevation and a travel direction, according to one embodiment of the present disclosure.
Figure 8:
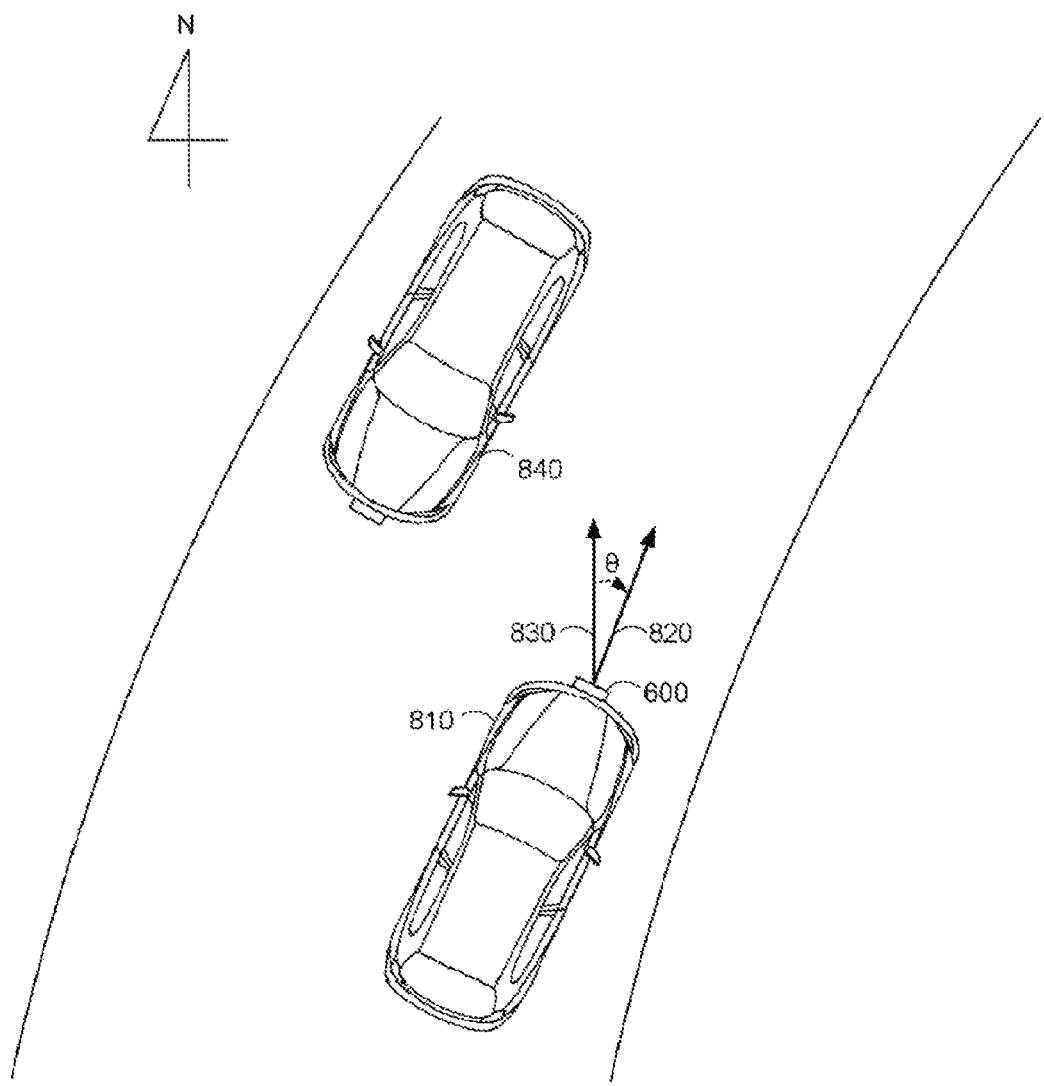
FIG. 8 illustrates an example where the spread spectrum radar device mounted on a vehicle transmits a spread spectrum radar signal based on an elevation and a two-dimensional travel direction of the vehicle, according to one embodiment of the present disclosure.
Figure 9:
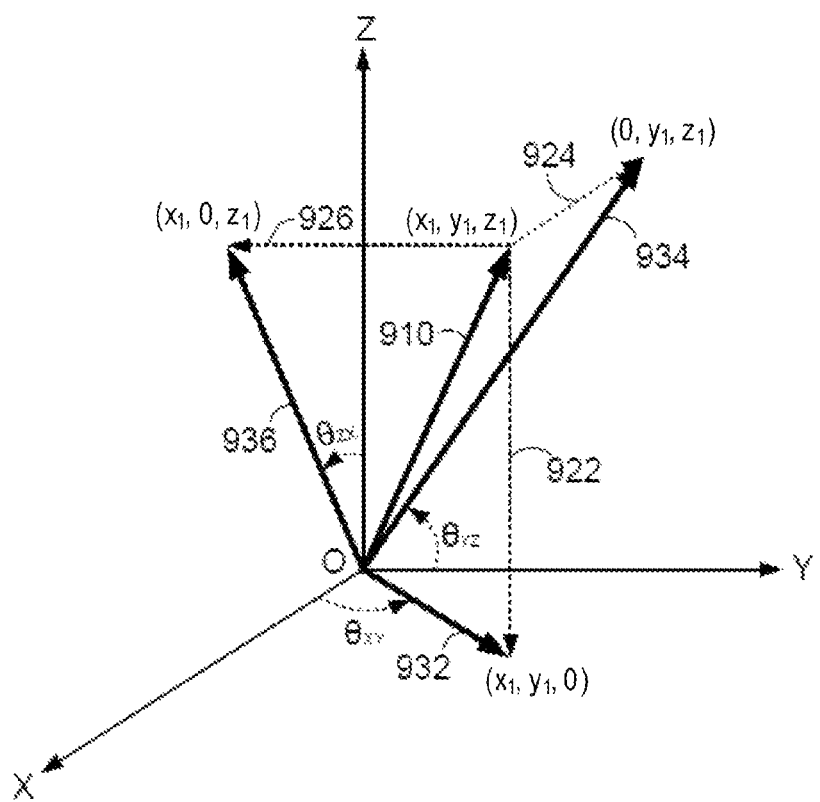
FIG. 9 illustrates an example where the spread spectrum radar device mounted on a vehicle transmits a spread spectrum radar signal based on an elevation and a three-dimensional travel direction of the vehicle, according to one embodiment of the present disclosure.

FIG. 7 is a flow chart of a method, performed by the spread spectrum radar device 600, for generating and transmitting a spread spectrum radar signal based on an elevation and a travel direction, according to one embodiment of the present disclosure. FIG. 8 illustrates an example where the spread spectrum radar device 600 mounted on a vehicle 810 transmits a spread spectrum radar signal based on an elevation and a two-dimensional travel direction of the vehicle 810, according to one embodiment of the present disclosure. FIG. 9 illustrates an example where the spread spectrum radar device 600 mounted on a vehicle transmits a spread spectrum radar signal based on an elevation and a three-dimensional travel direction of the vehicle, according to one embodiment of the present disclosure. Hereinafter, with reference to FIGS. 7 to 9, the operation of the spread spectrum radar device 600 will be described.

The spread spectrum radar device 600 measures an elevation, at step S710, and measures a travel direction, at 5720. The measured elevation and travel direction of the spread spectrum radar device 600 may be considered as the elevation and travel direction of the vehicle 810. Although FIG. 7 illustrates that the elevation is measured prior to measuring the travel direction, the travel direction may be measured prior to measuring the elevation. On the other hand, the elevation and the travel direction may be measured simultaneously. At 5730, the spread spectrum radar device 600 determines a spread sequence based on the measured elevation and travel direction.

According to one embodiment of the present disclosure, when the spread spectrum radar device 600 determines a spread sequence based on a two-dimensional travel direction of a vehicle, a pre-set two-dimensional reference direction may be used. The reference direction may be pre-set commonly for the spread spectrum radar devices that are mounted on vehicles. In addition, the reference direction may be set as a specific direction on the ground surface (for example, on the basis of a geographical direction). In some embodiments of the present disclosure, one among the four directions of east, west, south, and north may be set as the reference direction, or one among the eight directions of east, southeast, south, southwest, west, northwest, north, and northeast may be set as the reference direction. In another embodiment of the present disclosure, when the directions of one round on the ground surface can be represented as a range from 0° to 360°, the direction of a specific angle (for example, 110°) in the range may be set as the reference direction. In FIG. 8, as indicated by an arrow 830, the north direction is set as the reference direction (see the north arrow in FIG. 8).

In this embodiment, the spread spectrum radar device 600 may determine an angle θ formed between the reference direction and the travel direction. As illustrated in FIG. 8, the angle θ may be determined by measuring an angle between the reference direction (indicated by the arrow 830) and the travel direction of the vehicle 810 (indicated by an arrow 820) on a two-dimensional plane. For example, as indicated by a dotted arrow in FIG. 8, the angle θ may be determined by measuring the angle from the reference direction to the travel direction of the vehicle 810 in a clockwise direction. On the other hand, the angle θ may be determined by measuring the angle from the reference direction to the travel direction of the vehicle 810 in a counter-clockwise direction. Otherwise, the angle θ may be determined by measuring the angle from the travel direction of the vehicle 810 to the reference direction in a clockwise direction (or a counter-clockwise direction).

The spread spectrum radar device 600 may select one spread sequence among a plurality of spread sequences stored in the storage device 650 based on the combination of the measured elevation and the determined angle θ.

According to one embodiment, a plurality of partial elevation ranges $R_1, R_2, R_3, \ldots, R_n$ and a plurality of partial angle ranges $A_1, A_2, A_3, \ldots, A_t$ may be set. In this embodiment, the partial elevation ranges and the partial angle ranges are combined to provide a plurality of combinations, which may be denoted as $C_1, C_2, C_3, \ldots, C_s$. The spread spectrum radar device 600 may select one spread sequence from one or more spread sequences that are assigned to the combination (e.g., $C_j$) of a partial elevation range (e.g., $R_k$), which includes the measured elevation, and a partial angle range (e.g., $A_i$), which includes the determined angle θ.

For example, if three partial elevation ranges $R_1$, $R_2$, and $R_3$ and two partial angle ranges $A_1$ and $A_2$ are set, six combinations $C_1, C_2, C_3, C_4, C_5$, and $C_6$ may be provided. In this configuration, if a pseudo-noise sequence period is 31, six spread sequences $S_1, S_2, S_3, S_4, S_5$, and $S_6$ may be assigned to the combinations $C_1, C_2, C_3, C_4, C_5$, and $C_6$, as follows:

Combination of $R_1$ and $A_1$: $C_1 = \{S_1\}$
Combination of $R_1$ and $A_2$: $C_2 = \{S_2\}$
Combination of $R_2$ and $A_1$: $C_3 = \{S_3\}$
Combination of $R_2$ and $A_2$: $C_4 = \{S_4\}$
Combination of $R_3$ and $A_1$: $C_5 = \{S_5\}$
Combination of $R_3$ and $A_2$: $C_6 = \{S_6\}$ In this case, for example, if the measured elevation is in the partial elevation range of $R_2$ and the measured angle θ is in the partial angle range of $A_2$, the spread sequence $S_4$, which is in the combination $C_4$ (i.e., the combination of $R_2$ and $A_2$), is determined as the spread sequence for the measured elevation and the measured angle θ.

In another embodiment of the present disclosure, the spread spectrum radar device 600 may determine a spread sequence based on a three-dimensional travel direction of a vehicle. FIG. 9 illustrates a three-dimensional space that consists of the X-axis, the Y-axis, and the Z-axis, which may be set as, for example, three reference directions. In this embodiment, the X-Y plane may correspond to a two-dimensional plane where a vehicle is located, and the Z-axis may correspond to a direction vertical to the two-dimensional plane. For example, the X-axis and Y-axis may be the due south direction and the due east direction, respectively, in the position on the ground surface where a vehicle is located, and the Z-axis may be the direction toward the zenith from the above position on the ground surface.

The three-dimensional travel direction of the vehicle, which is measured in the travel direction measurement unit 660, may be indicated by a three-dimensional travel direction vector 910 (e.g., a unit vector having length 1). The origin O at which the X-axis, the Y-axis, and the Z-axis intersect is set as the starting point of the travel direction vector 910 and the coordinate $(x_1, y_1, z_1)$ is set as the end point of the travel direction vector 910. In this embodiment, the three-dimensional travel direction vector 910 may be projected onto the X-Y plane along the direction of an arrow 922 that is indicated by a dotted line, and converted to a two-dimensional first direction vector 932. A first angle $\theta_{XY}$ may then be measured from the positive direction of the X-axis to the first direction vector 932 in a counter-clockwise direction. In a similar manner, a two-dimensional second direction vector 934 is obtained by projecting the three-dimensional travel direction vector 910 onto the Y-Z plane along the direction of an arrow 924 indicated by a dotted line, and a second angle $\theta_{YZ}$ may be measured from the positive direction of the Y-axis to the second direction vector 934 in a counter-clockwise direction. Also, in the Z-X plane, a two-dimensional third direction vector 936 is obtained by projecting the three-dimensional travel direction vector 910 onto the Z-X plane along the direction of an arrow 926 indicated by a dotted line, and a third angle $\theta_{ZX}$ may be measured from the positive direction of the Z-axis to the third direction vector 936 in a counter-clockwise direction.

On the other hand, the first, second, and third angles $\theta_{XY}$, $\theta_{YZ}$, and $\theta_{ZX}$ may be determined by measuring the angles from the X-axis, Y-axis, and Z-axis to the first, second, and third direction vectors 932, 934, and 936, respectively, in a clockwise direction. Otherwise, the first, second, and third angles $\theta_{XY}$, $\theta_{YZ}$, and $\theta_{ZX}$ may be determined by measuring the angles from the first, second, and third direction vectors 932, 934, and 936 to the X-axis, Y-axis, and Z-axis, respectively, in a clockwise direction (or a counter-clockwise direction). Alternatively, the first, second, and third angles may be determined by measuring the angles from the three-dimensional travel direction vector 910 to the first, second, and third direction vectors 932, 934, and 936, respectively, in a clockwise direction (or a counter-clockwise direction).

The spread spectrum radar device 600 may select one spread sequence among a plurality of spread sequences stored in the storage device 650 based on the combination of the measured elevation and the first, second, and third angles $\theta_{XY}$, $\theta_{YZ}$, and $\theta_{ZX}$.

According to one embodiment, a plurality of partial elevation ranges $R_1, R_2, R_3, \ldots, R_n$ and a plurality of partial angle ranges $A_1, A_2, A_3, \ldots, A_t$ may be set. In this embodiment, the partial elevation ranges and the partial angle ranges are combined to provide a plurality of combinations, which may be denoted as $C_1, C_2, C_3, \ldots, C_s$. The spread spectrum radar device 600 may select one spread sequence from one or more spread sequences that are assigned to the combination (e.g., $C_j$) of the partial elevation range (e.g., $R_k$), which includes the measured elevation, and the partial angle range (e.g., $A_i$), which includes the determined angles $\theta_{XY}$, $\theta_{YZ}$, and $\theta_{ZX}$.

For example, eight partial angle ranges $A_1, A_2, A_3, A_4, A_5, A_6, A_7$, and $A_8$ may be set, as follows:

$A_1$: $0° \leq \theta_{XY} < 180°$, $0° \leq \theta_{YZ} < 180°$, $0° \leq \theta_{ZX} < 180°$
$A_2$: $0° \leq \theta_{XY} < 180°$, $0° \leq \theta_{YZ} < 180°$, $180° \leq \theta_{ZX} < 360°$
$A_3$: $0° \leq \theta_{XY} < 180°$, $180° \leq \theta_{YZ} < 360°$, $0° \leq \theta_{ZX} < 180°$
$A_4$: $0° \leq \theta_{XY} < 180°$, $180° \leq \theta_{YZ} < 360°$, $180° \leq \theta_{ZX} < 360°$
$A_5$: $180° \leq \theta_{XY} < 360°$, $0° \leq \theta_{YZ} < 180°$, $0° \leq \theta_{ZX} < 180°$
$A_6$: $180° \leq \theta_{XY} < 360°$, $0° \leq \theta_{YX} < 180°$, $180° \leq \theta_{ZX} < 360°$
$A_7$: $180° \leq \theta_{XY} < 360°$, $180° \leq \theta_{YZ} < 360°$, $0° \leq \theta_{ZX} < 180°$
$A_8$: $180° \leq \theta_{XY} < 360°$, $180° \leq \theta_{YZ} < 360°$, $180° \leq \theta_{ZX} < 360°$ In this example, if two partial elevation ranges $R_1$ and $R_2$ are set, sixteen combinations $C_1, C_2, C_3, C_4, C_5, C_6, C_7, C_8, C_9, C_{10}, C_{11}, C_{12}, C_{13}, C_{14}, C_{15}$, and $C_{16}$ can be provided. In this configuration, for example, if a pseudo-noise sequence period is 255, sixteen spread sequences $S_1, S_2, S_3, S_4, S_5, S_6, S_7, S_8, S_9, S_{10}, S_{11}, S_{12}, S_{13}, S_{14}, S_{15}$, and $S_{16}$ may be assigned to the combinations $C_1, C_2, C_3, C_4, C_5, C_6, C_7, C_8, C_9, C_{10}, C_{11}, C_{12}, C_{13}, C_{14}, C_{15}$, and $C_{16}$, as follows:

Combination of $R_1$ and $A_1$: $C_1 = \{S_1\}$
Combination of $R_1$ and $A_2$: $C_2 = \{S_2\}$
Combination of $R_1$ and $A_3$: $C_3 = \{S_3\}$
Combination of $R_1$ and $A_4$: $C_4 = \{S_4\}$
Combination of $R_1$ and $A_5$: $C_5 = \{S_5\}$
Combination of $R_1$ and $A_6$: $C_6 = \{S_6\}$
Combination of $R_1$ and $A_7$: $C_7 = \{S_7\}$
Combination of $R_1$ and $A_8$: $C_8 = \{S_8\}$
Combination of $R_2$ and $A_1$: $C_9 = \{S_9\}$
Combination of $R_2$ and $A_2$: $C_{10} = \{S_{10}\}$
Combination of $R_2$ and $A_3$: $C_{11} = \{S_{11}\}$
Combination of $R_2$ and $A_4$: $C_{12} = \{S_{12}\}$
Combination of $R_2$ and $A_5$: $C_{13} = \{S_{13}\}$
Combination of $R_2$ and $A_6$: $C_{14} = \{S_{14}\}$
Combination of $R_2$ and $A_7$: $C_{15} = \{S_{15}\}$
Combination of $R_2$ and $A_8$: $C_{16} = \{S_{16}\}$ In this configuration, for example, if the measured elevation is in the partial elevation range $R_2$ and, as illustrated in FIG. 9, each of the first, second, and third angles $\theta_{XY}$, $\theta_{YZ}$, and $\theta_{ZX}$ are in the range of 0° to 180°, i.e., the partial angle range $A_1$, the spread sequence $S_9$, which is assigned to the combination $C_9$ (i.e., the combination of $R_2$ and $A_1$), is determined as the spread sequence for the measured elevation and the measured angles $\theta_{XY}$, $\theta_{YZ}$, and $\theta_{ZX}$.

At S740, the spread spectrum radar device 600 transmits a spread spectrum radar signal based on the determined spread sequence. The spread spectrum radar device 600 receives a spread spectrum radar signal, which is reflected by an object, via the receiving antenna 680, at S750, and detects the object based on the received spread spectrum radar signal, at S760.

In this embodiment, although vehicles travel on the same elevation, if the travel directions of the vehicles are different from each other, the spread sequences selected in the vehicles are different from each other since the spread sequences are determined based on the combinations of the elevation and the travel directions, and thus, interference between the radar signals from the vehicle can be prevented. For example, as shown in FIG. 8, since the vehicles 810 and 840 move on the same road and face each other, but have different travel directions, they transmit spread spectrum radar signals based on different spread sequences. Therefore, the interference between radar signals does not occur between the vehicles 810 and 840 of FIG. 8.

Although the spread sequences used by the spread spectrum radar devices 100 and 600 of the present disclosure are described as being pre-stored in the storage devices 150 and 650, the spread sequences may be generated in real time by any suitable spread sequence algorithm. For example, the processors 130 and 630 of the spread spectrum radar devices 100 and 600 may be programmed to perform an algorithm to generate spread data by having a measured elevation as an input.

According to the present disclosure, when vehicles equipped with spread spectrum radar devices travel on the roads with different elevations, it is possible to prevent interference between the radar signals from the spread spectrum radar devices.

Further, according to the present disclosure, although the vehicles travel on the road with the same elevation, if the vehicles travel in different directions, it is possible to prevent interference between the radar signals from the spread spectrum radar devices.

While the method of the present disclosure has been described through particular embodiments, the method may also be embodied as a computer-readable code on a computer-readable storage medium. The computer-readable storage medium includes all kinds of recording devices storing data that is readable by a computer system. Examples of the computer-readable storage medium include a ROM, a RAM, a CD-ROM, a magnetic tape, a floppy disk, an optical data storage device, and the like. The computer-readable storage medium may also be realized in the form of a carrier wave (e.g., transmission via internet). Further, the computer-readable storage medium may be distributed in the computer system connected by a network, where the computer readable code can be stored and executed in a distribution manner. A functional program, codes, and code segments for realizing the above embodiments can be easily inferred by programmers skilled in the art.

Although the present disclosure has be described with respect to certain embodiments, it will be understood that various modifications and changes may be made without departing from the spirit and scope of the present disclosure, as those skilled in the art will appreciate. Further, it is considered that such modifications and changes fall within the scope of the claims appended hereto.

What is claimed is:

1. A method for transmitting a spread spectrum radar signal, comprising:
    storing a plurality of spread sequences;
    measuring an elevation of a vehicle;
    selecting at least one spread sequence of the plurality of spread sequences based on the measured elevation of the vehicle; and
    transmitting a spread spectrum radar signal based on the selected at least one spread sequence.

2. The method of claim 1, wherein storing the plurality of spread sequences comprises storing a plurality of elevation ranges and the plurality of spread sequences by associating the plurality of elevation ranges with the plurality of spread sequences, and
    wherein selecting the at least one spread sequence of the plurality of spread sequences based on the measured elevation of the vehicle comprises:
    determining an elevation range, which includes the measured elevation of the vehicle, from the plurality of elevation ranges; and
    selecting a spread sequence associated with the determined elevation range.

3. The method of claim 1, wherein selecting the at least one spread sequence of the plurality of spread sequences based on the measured elevation of the vehicle comprises selecting two or more spread sequences, and
    wherein transmitting the spread spectrum radar signal based on the selected at least one spread sequence comprises transmitting two or more spread spectrum radar signals based on the selected two or more spread sequences.

4. The method of claim 3, wherein transmitting the two or more spread spectrum radar signals based on the selected two or more spread sequences comprises transmitting the two or more spread spectrum radar signals in two or more directions.

5. The method of claim 1, further comprising measuring a travel direction of the vehicle,
    wherein selecting the at least one spread sequence of the plurality of spread sequences based on the measured elevation of the vehicle comprises selecting the at least one spread sequence based on the measured elevation of the vehicle and the measured travel direction of the vehicle.

6. The method of claim 5, wherein selecting the at least one spread sequence based on the measured elevation of the vehicle and the measured travel direction of the vehicle comprises:
    determining an angle between a pre-set reference direction and the measured travel direction of the vehicle; and
    selecting the at least one spread sequence based on the measured elevation of the vehicle and the determined angle.

7. The method of claim 6, wherein determining the angle between the pre-set reference direction and the measured travel direction of the vehicle comprises measuring the angle between the pre-set reference direction and the measured travel direction of the vehicle in a clockwise direction or a counter-clockwise direction.

8. The method of claim 5, wherein selecting the at least one spread sequence based on the measured elevation of the vehicle and the measured travel direction of the vehicle comprises selecting the at least one spread sequence based on the measured elevation of the vehicle and a measured three-dimensional travel direction of the vehicle.

9. The method of claim 8, wherein selecting the at least one spread sequence based on the measured elevation of the vehicle and the measured three-dimensional travel direction of the vehicle comprises:
    determining an angle between a pre-set reference direction and at least one two-dimensional travel direction, which is obtained by projecting the three-dimensional travel direction onto at least one two-dimensional plane in a three-dimensional space; and
    selecting the at least one spread sequence based on the measured elevation of the vehicle and the determined angle.

10. The method of claim 9, wherein determining the angle between the pre-set reference direction and the at least one two-dimensional travel direction comprises measuring the angle between the pre-set reference direction and the two-dimensional travel direction in a clockwise direction or a counter-clockwise direction.

11. The method of claim 1, wherein the spread sequence is one of a pseudo-noise sequence and a Walsh-Hadamard code.

12. An apparatus for transmitting a spread spectrum radar signal, comprising:
    a storage unit configured to store a plurality of spread sequences;
    an elevation measurement unit configured to measure an elevation of a vehicle;
    a processor configured to select at least one spread sequence of the plurality of spread sequences based on the measured elevation of the vehicle; and
    a transmission unit configured to transmit a spread spectrum radar signal based on the selected at least one spread sequence.

13. The apparatus of claim 12, wherein the storage unit is configured to store a plurality of elevation ranges and the plurality of spread sequences by associating the plurality of elevation ranges with the plurality of spread sequences, and
    wherein the processor is configured to:
    determine an elevation range, which includes the measured elevation of the vehicle, from the plurality of elevation ranges; and
    select a spread sequence associated with the determined elevation range.

14. The apparatus of claim 12, wherein the processor is configured to select two or more spread sequences of the plurality of spread sequences based on the measured elevation of the vehicle, and wherein the transmission unit is configured to transmit two or more spread spectrum radar signals based on the selected two or more spread sequences.

15. The apparatus of claim 14, wherein the transmission unit is configured to transmit the two or more spread spectrum radar signals in two or more directions.

16. The apparatus of claim 12, further comprising a travel direction measurement unit configured to measure a travel direction of the vehicle,
wherein the processor is configured to select the at least one spread sequence based on the measured elevation of the vehicle and the measured travel direction of the vehicle.

17. The apparatus of claim 16, wherein the processor is configured to:
determine an angle between a pre-set reference direction and the measured travel direction of the vehicle; and
select the at least one spread sequence based on the measured elevation of the vehicle and the determined angle.

18. The apparatus of claim 16, wherein the processor is configured to select the at least one spread sequence based on the measured elevation of the vehicle and a measured three-dimensional travel direction of the vehicle.

19. The apparatus of claim 18, wherein the processor is configured to:
determine an angle between a pre-set reference direction and at least one two-dimensional travel direction, which is obtained by projecting the three-dimensional travel direction onto at least one two-dimensional plane in a three-dimensional space; and
select the at least one spread sequence based on the measured elevation of the vehicle and the determined angle.

20. The apparatus of claim 12, wherein the spread sequence is one of a pseudo-noise sequence and a Walsh-Hadamard code.

21. A method for selecting a spread sequence, comprising:
storing a plurality of spread sequences;
measuring an elevation of a vehicle;
generating elevation data indicative of the measured elevation of the vehicle; and
selecting at least one spread sequence of the plurality of spread sequences based on the elevation data,
wherein the selected spread sequence is a spread sequence different from a spread sequence that is selectable by a vehicle travelling on an elevation different from the elevation of the vehicle.

22. The method of claim 21, further comprising measuring a travel direction of the vehicle,
wherein selecting the at least one spread sequence of the plurality of spread sequences based on the elevation data comprises selecting the at least one spread sequence based on the measured elevation of the vehicle and the measured travel direction of the vehicle.

23. A method for transmitting a spread spectrum radar signal, comprising:
measuring an elevation of a vehicle;
determining a spread sequence based on the measured elevation of the vehicle; and
transmitting a spread spectrum radar signal based on the determined spread sequence.

24. A non-transitory computer-readable storage medium having a program including instructions that, when executed, cause a processor to perform operations of:
storing a plurality of spread sequences;
measuring an elevation of a vehicle;
selecting at least one spread sequence of the plurality of spread sequences based on the measured elevation of the vehicle; and
transmitting a spread spectrum radar signal based on the selected at least one spread sequence.

* * * * *